(12) United States Patent
Mizuta (10) Patent No.: US 8,170,749 B2
(45) Date of Patent: May 1, 2012

(54) ROLL RIGIDITY CONTROLLER OF VEHICLE

(75) Inventor: Yuichi Mizuta, Suntou-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 322 days.

(21) Appl. No.: 12/446,465

(22) PCT Filed: Nov. 30, 2007

(86) PCT No.: PCT/JP2007/073631
§ 371 (c)(1),
(2), (4) Date: Apr. 21, 2009

(87) PCT Pub. No.: WO2008/066207
PCT Pub. Date: Jun. 5, 2008

(65) Prior Publication Data
US 2010/0318262 A1    Dec. 16, 2010

(30) Foreign Application Priority Data

Nov. 30, 2006  (JP) ................. 2006-324330

(51) Int. Cl.
*B60G 17/016* (2006.01)
(52) U.S. Cl. ............. 701/38; 280/5.506; 280/5.508
(58) Field of Classification Search ......... 280/5.506, 280/5.507, 5.508, 5.511; 701/37, 38, 40
See application file for complete search history.

(56) References Cited

U.S. PATENT DOCUMENTS

| | | | |
|---|---|---|---|
| 4,948,164 A | | 8/1990 | Hano et al. |
| 5,092,624 A | * | 3/1992 | Fukuyama et al. ........ 280/5.506 |
| 5,251,136 A | | 10/1993 | Fukuyama et al. |
| 5,396,423 A | | 3/1995 | Fujimura et al. |

(Continued)

FOREIGN PATENT DOCUMENTS

CN    1781747 A    6/2006

(Continued)

OTHER PUBLICATIONS

Office Action issued Jan. 17, 2011, in German Patent Application No. 11 2007002 800.9-21 (with English translation).

*Primary Examiner* — Ruth Ilan
*Assistant Examiner* — Laura Freedman
(74) *Attorney, Agent, or Firm* — Oblon, Spivak, McClelland, Maier & Neustadt, L.L.P.

(57) ABSTRACT

A target roll angle of the vehicle is computed based on an actual lateral acceleration at the centroid of the vehicle, and the lateral acceleration of the vehicle at the centroid is corrected by use of lateral acceleration correction amounts based on a yaw rate of the vehicle, whereby the lateral accelerations of the vehicle at the front wheel position and the rear wheel position are computed. Subsequently, target anti-roll moments at the front wheel position and the rear wheel position are computed based on the target roll angle and the accelerations of the vehicle at the front wheel position and the rear wheel position, and active stabilizer apparatuses of the front and rear wheels are controlled based on these target anti-roll moments.

11 Claims, 6 Drawing Sheets

U.S. PATENT DOCUMENTS

| | | | |
|---|---|---|---|
| 5,500,798 A * | 3/1996 | Inagaki | 701/37 |
| 5,948,027 A | 9/1999 | Oliver, Jr. et al. | |
| 6,766,225 B2 * | 7/2004 | Lee | 701/1 |
| 6,898,966 B2 * | 5/2005 | Ono et al. | 73/146 |
| 7,418,325 B2 * | 8/2008 | Yamada et al. | 701/38 |
| 7,970,512 B2 * | 6/2011 | Lu et al. | 701/41 |
| 2004/0006410 A1 | 1/2004 | Lee | |
| 2005/0005691 A1 | 1/2005 | Ono et al. | |
| 2006/0006615 A1 * | 1/2006 | Mizuta | 280/5.508 |
| 2007/0150144 A1 * | 6/2007 | Yasui | 701/38 |

FOREIGN PATENT DOCUMENTS

| | | |
|---|---|---|
| DE | 100 02 455 | 7/2001 |
| DE | 697 13 694 T2 | 10/2002 |
| DE | 10 2006 052 698 A1 | 5/2007 |
| JP | 2 37014 | 2/1990 |
| JP | 5 124410 | 5/1993 |
| JP | 5 84508 | 11/1993 |
| JP | 6 211018 | 8/1994 |
| JP | 2001 280995 | 10/2001 |
| JP | 2004 74842 | 3/2004 |
| JP | 2005 238971 | 9/2005 |
| JP | 2005 329794 | 12/2005 |
| JP | 2006 21594 | 1/2006 |
| JP | 2006-256368 | 9/2006 |
| JP | 2006-281876 | 10/2006 |

* cited by examiner

ROLL RIGIDITY CONTROLLER OF VEHICLE

TECHNICAL FIELD

The present invention relates to a roll rigidity control apparatus for a vehicle, and more particularly to a roll rigidity control apparatus for a vehicle which includes roll rigidity changing means at a front wheel position or a rear wheel position.

BACKGROUND ART

In general, a roll rigidity control apparatus for a vehicle, such as an automobile, which apparatus includes roll rigidity changing means, such as an active stabilizer apparatus, at a front wheel position and a rear wheel position, is configured to compute a target-roll control variable of the entire vehicle from lateral acceleration of the vehicle, distribute the target-roll control variable of the entire vehicle to front and rear wheels on the basis of a front-rear distribution ratio of roll rigidity to thereby compute target-roll control variables for the front wheel position and the rear wheel position, and control the roll rigidity changing means at the front wheel position and the rear wheel position on the basis of the target-roll control variables for the front wheel position and the rear wheel position.

Such a roll rigidity control apparatus is already known and disclosed in Japanese Patent Application Laid-Open (kokai) No. 2006-21594 for the application filed by the applicant of the present application. The roll rigidity control apparatus disclosed in the publication estimates for the front and rear wheels the degrees of margin for generation of lateral force, computes a ratio of distribution of roll rigidity to the front and rear wheels such that it reduces the magnitude of a difference in degree of margin for generation of lateral force between the front and rear wheels, and distributes a target-roll control variable of the entire vehicle based on lateral acceleration of the vehicle to the front and rear wheels on the basis of the roll rigidity distribution ratio, to thereby compute target-roll control variables for the front wheel position and the rear wheel position. This previously proposed roll rigidity control apparatus can more properly control the roll rigidities at the front wheel position and the rear wheel position in accordance with the degrees of margin for generation of lateral force of the front and rear wheels, as compared with a conventionally known general roll rigidity control apparatus in which the front-rear distribution ratio of roll rigidity is previously set.

In general, when a vehicle turns, the vehicle revolves about the center of turn, and rotates in a yaw direction about the centroid of the vehicle. Therefore, lateral accelerations at the front wheel position and the rear wheel position differ from that at the centroid. Further, the centroid of the vehicle is typically located forward of the geometric center between the front wheel position and the rear wheel position, and the lateral accelerations at the front wheel position and the rear wheel position differ from each other. The difference between these lateral accelerations changes depending on the state of turn motion of the vehicle, and in particular, changes depending on the state of rotation of the vehicle even when the revolution radius at the time of turning is the same.

Therefore, the above-described conventionally known general roll rigidity control apparatus and the above-described previously proposed roll rigidity control apparatus cannot control the roll rigidities at the front wheel position and the rear wheel position while sufficiently taking into consideration that lateral acceleration differs between the front wheel position and the rear wheel position and that the difference in lateral acceleration changes depending on the state of turn motion of the vehicle. Accordingly, the conventionally known roll rigidity control apparatus and the proposed roll rigidity control apparatus have a problem in that they cannot necessary perform optimal roll rigidity control in accordance with the state of turn motion of the vehicle.

Further, the above-described conventionally known general roll rigidity control apparatus and the above-described previously proposed roll rigidity control apparatus premise that a vehicle includes roll rigidity changing means at each of the front wheel position and the rear wheel position. Therefore, for a vehicle which includes roll rigidity changing means only at the front wheel position or the rear wheel position, studies have not yet been performed on a manner of controlling the roll rigidities at the front wheel position and the rear wheel position in consideration that lateral acceleration differs between the front wheel position and the rear wheel position and that the difference of lateral acceleration changes depending on the state of turn motion of the vehicle, as described above.

DISCLOSURE OF THE INVENTION

In view of the above-described problem involved in the conventional roll rigidity control apparatus for a vehicle which includes roll rigidity changing means at a front wheel position and a rear wheel position, a main object of the present invention is to optimally control the roll rigidity of the vehicle irrespective of the state of turn motion of the vehicle, by estimating lateral accelerations at the front wheel position or the rear wheel position, and controlling roll rigidity changing means at the front wheel position or the rear wheel position in accordance with a control variable based on the estimated lateral acceleration at the front wheel position or the rear wheel position.

According to the present invention, there is provided a roll rigidity control apparatus for a vehicle which includes roll rigidity changing means at a front wheel position or a rear wheel position, the apparatus being characterized by comprising lateral acceleration acquisition means for acquiring a lateral acceleration of the vehicle at the centroid thereof; yaw rate acquisition means for acquiring a yaw rate of the vehicle about the centroid; lateral acceleration computation means for computing a lateral acceleration of the vehicle at the front wheel position or the rear wheel position on the basis of the lateral acceleration and the yaw rate; and control means for computing a target anti-roll moment at the front wheel position or the rear wheel position on the basis of the lateral acceleration of the vehicle at the front wheel position or the rear wheel position, correspondingly, and controlling the roll rigidity changing means at the front wheel position or the rear wheel position on the basis of the target anti-roll moment at the front wheel position or the rear wheel position, correspondingly.

Figure 8:
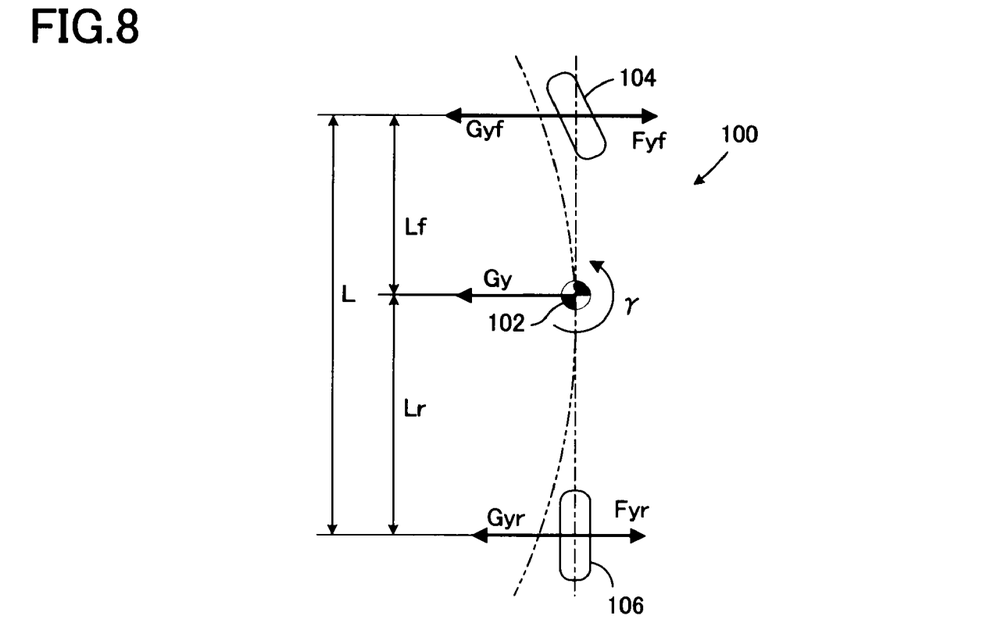
FIG. 8 is an explanatory view showing a two-wheel model of front and rear wheels of a vehicle for the case of left turn.

FIG. 8 shows a two-wheel model of front and rear wheels of a vehicle. Here, the mass of the vehicle 100 is represented by M; lateral acceleration at the centroid 102 of the vehicle is represented by Gy; lateral forces acting on the front wheel 104 and the rear wheel 106 are represented by Fyf and Fyr, respectively; yaw inertial moment of the vehicle is represented by Iz; the rate of change of yaw rate γ at the centroid 102 of the vehicle is represented by γd; and the distances between the centroid 102 of the vehicle and the front wheel position and the rear wheel position as measured along the front-rear direction of the vehicle are represented by Lf and Lr, respectively. In such case, the following Equations 1 and 2 stand, because of the balance of force in the lateral direction of the vehicle and that about the centroid.

$$M \cdot Gy = Fyf + Fyr \quad (1)$$

$$Iz \cdot \gamma d = Lf \cdot Fyf - Lr \cdot Fyr \quad (2)$$

Further, when masses of the vehicle supported by the front wheel and the rear wheel are represented by Mf and Mr, respectively, the masses Mf and Mr are represented by the following Equations 3 and 4, respectively; and when lateral accelerations at the front wheel position and the rear wheel position are represented by Gyf and Gyr, respectively, the following Equations 5 and 6 stand, because of the balance of force in the lateral direction of the vehicle at the front wheel position and that at the rear wheel position.

$$Mf = M \cdot Lr/(Lf + Lr) \quad (3)$$

$$Mr = M \cdot Lf/(Lf + Lr) \quad (4)$$

$$Mf \cdot Gyf = Fyf \quad (5)$$

$$Mr \cdot Gyr = Fyr \quad (6)$$

When the above-described Equations 3 to 6 are substituted into the above-described Equations 1 and 2 followed by rearrangement, the following Equations 7 and 8 are obtained.

$$Gyf = Gy + Iz \cdot \gamma d/(M \cdot Lr) \quad (7)$$

$$Gyr = Gy - Iz \cdot \gamma d/(M \cdot Lf) \quad (8)$$

Equations 7 and 8 show that the lateral accelerations Gyf and Gyr at the front wheel position and the rear wheel position can be computed on the basis of the lateral acceleration Gy of the vehicle at the centroid 102 and the yaw rate γ of the vehicle about the centroid 102; in particular, the rate of change γd thereof.

According to the above-described configuration, the lateral acceleration of the vehicle at the front wheel position or the rear wheel position is computed on the basis of the lateral acceleration of the vehicle at the centroid and the yaw rate of the vehicle about the centroid; the target anti-roll moment at the front wheel position or the rear wheel position is computed on the basis of the lateral acceleration of the vehicle at the front wheel position or the rear wheel position, correspondingly; and the roll rigidity changing means at the front wheel position or the rear wheel position is controlled on the basis of the target anti-roll moment at the front wheel position or the rear wheel position, correspondingly.

Accordingly, as compared with the conventional roll rigidity control apparatus in which the target-roll control variable of the entire vehicle computed on the basis of lateral acceleration of the vehicle is distributed to the front and rear wheels so as to compute target-roll control variables for the front wheel position and the rear wheel position, and the roll rigidity changing means at the front wheel position and the rear wheel position are controlled on the basis of the target-roll control variables for the front wheel position and the rear wheel position, the roll rigidity at the front wheel position or the rear wheel position can be controlled reliably and accurately in accordance with the roll moment at the front wheel position or the rear wheel position, whereby optimal roll rigidity control can be performed reliably in accordance with the state of turn motion of the vehicle.

In the above-described configuration, the control means may be configured to compute a target roll angle of the vehicle on the base of at least the lateral acceleration of the vehicle at the centroid, and compute, on the basis of the lateral acceleration of the vehicle at the front wheel position or the rear wheel position, the target anti-roll moment at the front wheel position or the rear wheel position which renders the roll angle of the vehicle coincident with the target roll angle.

According to this configuration, the target anti-roll moment at the front wheel position or the rear wheel position can be computed as a value which corresponds to the lateral acceleration at the front wheel position or the rear wheel position, correspondingly.

The above-described configuration may be such that the vehicle includes the roll rigidity changing means at each of the front wheel position or the rear wheel position; the lateral acceleration computation means computes lateral accelerations of the vehicle at the front wheel position and the rear wheel position on the basis of the lateral acceleration and the yaw rate; and the control means computes target anti-roll moments at the front wheel position and the rear wheel position on the basis of the lateral accelerations of the vehicle at the front wheel position and the rear wheel position, respectively, and controls the roll rigidity changing means at the front wheel position and the rear wheel position on the basis of the target anti-roll moments at the front wheel position and the rear wheel position, respectively.

According to this configuration, as compared with the conventional roll rigidity control apparatus in which the target-roll control variable of the entire vehicle computed on the basis of lateral acceleration of the vehicle is distributed to the front and rear wheels so as to compute target-roll control variables for the front wheel position and the rear wheel position, and the roll rigidity changing means at the front wheel position and the rear wheel position are controlled on the basis of the target-roll control variables for the front wheel position and the rear wheel position, the roll rigidities at the front wheel position and the rear wheel position can be controlled reliably and accurately in accordance with the roll moments at the front wheel position and the rear wheel position, whereby optimal roll rigidity control can be performed reliably in accordance with the state of turn motion of the vehicle. In addition, as compared with the case where only the roll rigidity changing means at the front wheel position or the rear wheel position is controlled, roll rigidity control can be performed effectively and reliably in accordance with the state of turn motion of the vehicle.

In the above-described configuration, the control means may be configured to compute a target roll angle of the vehicle on the base of at least the lateral acceleration of the vehicle at the centroid; compute, on the basis of the lateral acceleration of the vehicle at the front wheel position and a previously set front-rear distribution ratio of roll rigidity, the target anti-roll moment at the front wheel position which renders the roll angle of the vehicle coincident with the target roll angle; and compute, on the basis of the lateral acceleration of the vehicle at the rear wheel position and the previously set front-rear distribution ratio of roll rigidity, the target anti-roll moment at the rear wheel position which renders the roll angle of the vehicle coincident with the target roll angle.

According to this configuration, the target anti-roll moments at the front wheel position and the rear wheel position can be computed as values which correspond to the lateral accelerations at the front wheel position and the rear wheel position, respectively.

In the above-described configuration, the lateral acceleration computation means may be configured to compute a lateral acceleration correction amount for the front wheel position or the rear wheel position on the basis of the yaw rate of the vehicle about the centroid, and compute the lateral acceleration of the vehicle at the front wheel position or the rear wheel position by correcting the lateral acceleration of the vehicle at the centroid acquired by the lateral acceleration acquisition means by use of the lateral acceleration correction amount for the front wheel position or the rear wheel position, correspondingly.

According to the above-described Equation 7 and 8, the lateral accelerations Gyf and Gyr of the vehicle at the front wheel position and the rear wheel position can be computed as the sum of the lateral acceleration Gy of the vehicle at the centroid 102 (the first term) and the lateral acceleration correction amounts for the front wheel position and the rear wheel position (the second term) based on the yaw rate γ of the vehicle about the centroid 102; in particular, the rate of change γd of the yaw rate. In other words, it can be understood that the lateral accelerations Gyf and Gyr of the vehicle at the front wheel position and the rear wheel position can be computed through correction of the lateral acceleration Gy of the vehicle at the centroid performed by use of the lateral acceleration correction amounts for the front wheel position and the rear wheel position based on the yaw rate γ.

In accordance with the above-described configuration, the lateral acceleration correction amount for the front wheel position or the rear wheel position is computed on the basis of the yaw rate of the vehicle about the centroid; and the lateral acceleration of the vehicle at the front wheel position or the rear wheel position is computed by correcting the lateral acceleration of the vehicle at the centroid acquired by the lateral acceleration acquisition means by use of the lateral acceleration correction amount for the front wheel position or the rear wheel position, correspondingly. Therefore, the lateral acceleration at the front wheel position or the rear wheel position can be computed reliably and accurately in consideration of the state of rotation of the vehicle.

In the above-described configuration, the lateral acceleration computation means may be configured to make the magnitude of the correction amount smaller when the vehicle speed is low, as compared with the case where the vehicle speed is high.

In general, when the vehicle speed is low, the magnitude of the lateral acceleration of the vehicle is small as compared with the case where the vehicle speed is high, and the difference in lateral acceleration between the front wheel position and the rear wheel position is also small, so that the influence of the difference in lateral acceleration between the front wheel position and the rear wheel position on the sense of a vehicle occupant is also small. Further, as described above, the lateral acceleration correction amounts for the front wheel position and the rear wheel position based on the yaw rate of the vehicle about the centroid are lateral acceleration correction amounts based on the yaw rate change rate. Therefore, the correction amounts are likely to be affected by noise or the like. Accordingly, when the vehicle speed is low, preferably, the magnitudes of the lateral acceleration correction amounts for the front wheel position and the rear wheel position based on the yaw rate assume smaller values as compared with the case where the vehicle speed is high.

According to the above-described configuration, when the vehicle speed is low, the magnitude of the lateral acceleration correction amount for the front wheel position or the rear wheel position based on the yaw rate is made smaller as compared with the case where the vehicle speed is high. Therefore, when the vehicle speed is high, the lateral acceleration at the front wheel position or the rear wheel position can be computed reliably and accurately in sufficient consideration of the state of rotation of the vehicle; and when the vehicle speed is low, it is possible to effectively prevent the control variable of the roll rigidly changing means at the front wheel position or the rear front wheel position from suddenly changing, which change would otherwise occur when the values of the corrected lateral accelerations suddenly change because of influence of noise or the like.

In the above-described configuration, the lateral acceleration acquisition means may be configured to detect an actual lateral acceleration of the vehicle at the centroid, compute an estimated lateral acceleration of the vehicle at the centroid on the basis of a vehicle speed and a steering angle of steerable wheels, compute the lateral acceleration of the vehicle at the centroid on the basis of the actual lateral acceleration and the estimated lateral acceleration, and decrease, when the magnitude of the actual lateral acceleration is large, a weight of the estimated lateral acceleration as compared with the case where the magnitude of the actual lateral acceleration is small.

In general, the phase of the estimated lateral acceleration, which is computed on the basis of the vehicle speed and the steering angle of the steerable wheels, leads the phase of the actual lateral acceleration. Therefore, the above-described configuration enables the roll rigidities at the front wheel position and the rear wheel position to be controlled with higher responsiveness for a change in the turning state of the vehicle, as compared with the case where the lateral acceleration of the vehicle used for control of the roll rigidities is only the actual lateral acceleration.

Further, in general, when the degree of turn of the vehicle is large, the estimation accuracy of the estimated lateral acceleration at the centroid position of the vehicle, which acceleration is computed on the basis of the vehicle speed and the steering angle of the steerable wheels, decreases as compared with the case where the degree of turn of the vehicle is small. Therefore, when the degree of turn of the vehicle is large, preferably, the weight of the estimated lateral acceleration used for computation of the lateral acceleration from the actual lateral acceleration and the estimated lateral acceleration, is made smaller as compared with the case where the degree of turn of the vehicle is small. The degree of turn of the vehicle can be determined on the basis of the magnitude of the actual lateral acceleration of the vehicle.

According to the above-described configuration, when the magnitude of the actual lateral acceleration is large, the weight of the estimated lateral acceleration is made smaller as compared with the case where the magnitude of the actual lateral acceleration is small. Therefore, when the magnitude of the actual lateral acceleration is small, the roll rigidities at the front wheel position and the rear wheel position can be controlled with higher responsiveness for a change in the turning state of the vehicle; and when the magnitude of the actual lateral acceleration is large, it is possible to reliably reduce adverse influences which arise when the estimation accuracy of the estimated lateral acceleration lowers in a state where the degree of turn of the vehicle is high.

In the above-described configuration, the yaw rate acquisition means may be configured to detect an actual yaw of the vehicle about the centroid, compute an estimated lateral acceleration of the vehicle about the centroid on the basis of a vehicle speed and a steering angle of steerable wheels, compute, as an estimated yaw rate of the vehicle about the centroid, a product of the vehicle speed and the estimated lateral acceleration, compute the yaw rate of the vehicle about the centroid on the basis of the actual yaw rate and the estimated yaw rate, and decrease, when the magnitude of the actual lateral acceleration is large, a weight of the estimated yaw rate as compared with the case where the magnitude of the actual lateral acceleration is small.

In general, the phase of the estimated yaw rate, which is computed on the basis of the vehicle speed and the steering angle of the steerable wheels, leads the phase of the actual yaw rate. Therefore, the above-described configuration enables the roll rigidities at the front wheel position and the rear wheel position to be controlled with higher responsiveness for a change in the turning state of the vehicle, as compared with the case where the yaw rate used for control of the roll rigidities is only the actual yaw rate.

Further, in general, when the degree of turn of the vehicle is large, the estimation accuracy of the estimated yaw rate of the vehicle at the centroid, which is computed on the basis of the vehicle speed and the steering angle of the steerable wheels, decreases as compared with the case where the degree of turn of the vehicle is small. Therefore, when the degree of turn of the vehicle is large, preferably, the weight of the estimated yaw rate used for computation of the yaw rate from the actual yaw rate and the estimated yaw rate is made smaller as compared with the case where the degree of turn of the vehicle is small. In this case as well, the degree of turn of the vehicle can be determined on the basis of the magnitude of the actual lateral acceleration of the vehicle.

According to the above-described configuration, when the magnitude of the actual lateral acceleration is large, the weight of the estimated yaw rate is made smaller as compared with the case where the magnitude of the actual lateral acceleration is small. Therefore, when the degree of turn of the vehicle is small, the roll rigidities at the front wheel position and the rear wheel position can be controlled with higher responsiveness for a change in the turning state of the vehicle; and when the degree of turn of the vehicle is large, it is possible to reliably reduce adverse influences which arise when the estimation accuracy of the estimated yaw rate lowers.

In the above-described configuration, the lateral acceleration acquisition means may be configured to compute a lateral acceleration correction amount for the front wheel position on the basis of a distance between the centroid of the vehicle and the rear wheel position as measured along a front-rear direction of the vehicle and a change rate of the yaw rate of the vehicle about the centroid, or compute a lateral acceleration correction amount for the rear wheel position on the basis of a distance between the centroid of the vehicle and the front wheel position as measured along the front-rear direction of the vehicle and the change rate of the yaw rate of the vehicle about the centroid.

According to this configuration, as can be understood from the above-described Equation 7 and 8, the lateral acceleration correction amount for the front wheel position or the rear wheel position can be computed reliably and accurately.

Figure 9:
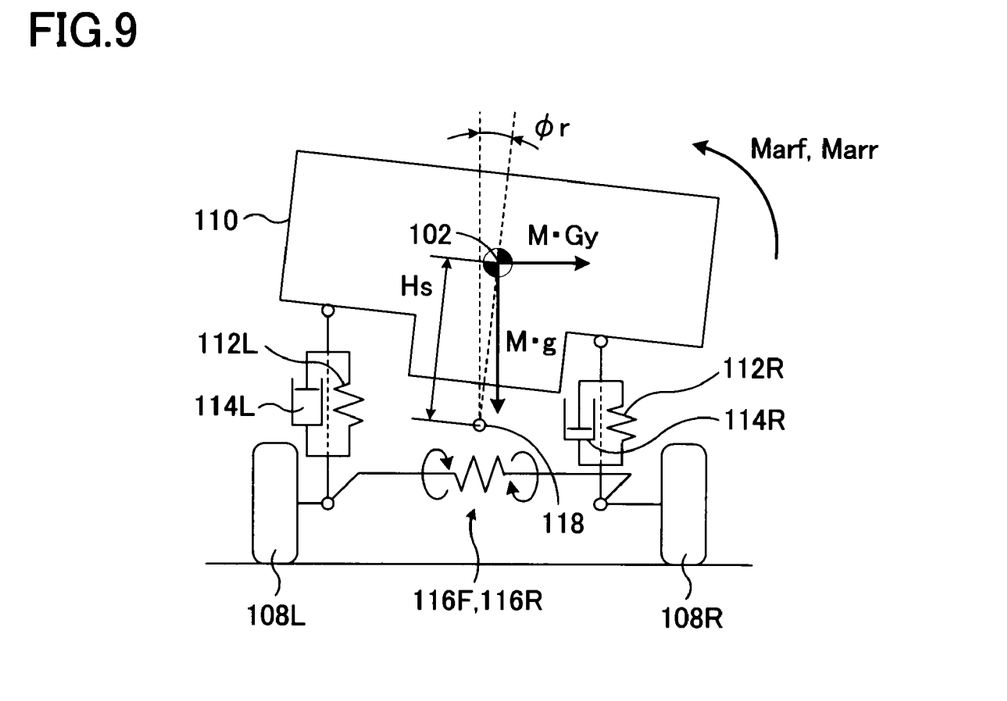
FIG. 9 is an explanatory view showing a vehicle in a left turn state, as viewed from the rear thereof.

FIG. 9 is an explanatory view showing a vehicle in a left turn state, as viewed from the rear thereof. In FIG. 9, 108L and 108R denote left and right wheels, respectively; and 110 denotes a vehicle body. Further, 112L and 112R denote left and right suspension springs, respectively; and 114L and 114R denote left and right shock absorbers, respectively. Moreover, 116F and 116R denote active stabilizer apparatuses at the front wheel position and the rear wheel position, each serving as roll rigidity changing means capable of increasing and decreasing stabilizer force; and 118 denotes the roll center of the vehicle.

As shown in FIG. 9, the mass of the vehicle 100 is represented by M; a lateral acceleration at the centroid 102 of the vehicle 100 is represented by Gy; and a target roll angle of the vehicle based on the lateral acceleration Gy is represented by φrt. Further, the roll rigidities of the vehicle at the front wheel position and the rear wheel position are represented by Krf and Krr, where the roll rigidities are determined by the suspension springs 112L and 112R, the active stabilizer apparatuses 116F and 116R at the front wheel position and the rear wheel position whose stabilizer forces are not controlled, etc. Further, the distance between the centroid 102 and the roll center 118 as measured along the vertical direction of the vehicle body is represented by Hs; target anti-roll moments at the front wheel position and the rear wheel position are represented by Masft and Masrt; and the gravitational acceleration is represented by g.

Here, the vehicle is assumed to be in a steady turning state, so that the active stabilizer apparatuses 116F and 116R at the front wheel position and the rear wheel position generate predetermined anti-roll moments Marf and Marr, and the roll angle φr of the vehicle coincides with the target roll angle φrt. In this case, the following Equation 9 stands because of the balance of moment about the roll center 118. Notably, g represents the gravitational acceleration.

$$(Krf+Krr)\varphi rt = M \cdot Gy \cdot Hs + M \cdot g \cdot Hs \cdot \varphi rt - (Marf+Marr) \quad (9)$$

Further, since the front-rear ratio of roll rigidity is equal to the front-rear ratio of roll moment; i.e., the ratio of roll moments born by the suspensions of the front and rear wheels, when the front-wheel-side distribution ratio of roll rigidity is represented by Rsf, the following Equation 10 stands.

$$Rsf = (Krf \cdot \varphi rt + Marf)/\{(Krf+Krr)\varphi rt + Marf+Marr)\} \quad (10)$$

From Equations 9 and 10, the flowing Equations 11 and 12 stand. Although the lateral acceleration Gy of the vehicle in the flowing Equations 11 and 12 is the lateral acceleration at the centroid, as described above, the lateral accelerations of the vehicle at the front wheel position and the rear wheel position differ from the lateral acceleration at the centroid and differ from each other, depending on the state of turn motion of the vehicle. Accordingly, the lateral acceleration of the vehicle at the front wheel position and the lateral acceleration of the vehicle at the rear wheel position are represented by Gyf and Gyr, respectively; and the lateral acceleration Gy of the vehicle in the flowing Equations 11 and 12 is replaced with the lateral acceleration Gyf of the vehicle at the front wheel position and the lateral acceleration Gyr of the vehicle at the rear wheel position, whereby the flowing Equations 13 and 14 are obtained. By use of these equations, the target anti-roll moment Marft at the front wheel position and the target anti-roll moment Marrt at the rear wheel position can be optimally computed in accordance with the state of turn motion of the vehicle, irrespective of the state of turn motion of the vehicle.

$$Marf = (M \cdot Gy \cdot Hs + M \cdot g \cdot Hs \cdot \varphi rt)Rsf - Krf \varphi rt \quad (11)$$

$$Marr = (M \cdot Gy \cdot Hs + M \cdot g \cdot Hs \cdot \varphi rt)(1-Rsf) - Krr \cdot \varphi rt \quad (12)$$

$$Marft = (M \cdot Gyf \cdot Hs + M \cdot g \cdot Hs \cdot \varphi rt)Rsf - Krf \varphi rt \quad (13)$$

$$Marrt = (M \cdot Gyr \cdot Hs + M \cdot g \cdot Hs \cdot \varphi rt)(1-Rsf) - Krr \cdot \varphi rt \quad (14)$$

Accordingly, in the above-described configuration, the control means may be configured to compute the target anti-roll moment Marft at the front wheel position or the target anti-roll moment Marrt at the rear wheel position on the basis of the lateral acceleration Gyf of the vehicle at the front wheel position and the lateral acceleration Gyr of the vehicle at the rear wheel position in accordance with Equations 13 and 14.

Further, in general, the roll moment (M·g·Hs·φrt) which acts on the vehicle due to the gravity is far smaller than the roll moment which acts on the vehicle due to a lateral force (centrifugal force). Therefore, the roll moment attributable to the gravity may be omitted for control of the roll rigidity.

Accordingly, in the above-described configuration, the control means may be configured to compute the target anti-roll moment Marft at the front wheel position or the target anti-roll moment Marrt at the rear wheel position in accordance with Equations 15 and 16.

$$Marft = M \cdot Gyf \cdot Hs \cdot Rsf - Krf \phi rt \quad (15)$$

$$Marrt = M \cdot Gyr \cdot Hs(1-Rsf) - Krr \phi rt \quad (16)$$

In the case where the vehicle includes the roll rigidity changing means only at the front wheel position or the rear wheel position, only the roll rigidity at the front wheel position or the rear wheel position where the roll rigidity changing means is provided can be controlled. Accordingly, in the case where the roll rigidity changing means is provided at the front wheel position only, the control means may be configured to compute the target anti-roll moment Marft at the front wheel position in accordance with the above-described Equation 13 or 15; and in the case where the roll rigidity changing means is provided at the rear wheel position only, the control means may be configured to compute the target anti-roll moment Marrt at the rear wheel position in accordance with the above-described Equation 14 or 16.

In the above-described configuration, the lateral acceleration computation means may be configured to compute the lateral accelerations Gyf and Gyr of the vehicle at the front wheel position and the rear wheel position in accordance with the above-described Equations 7 and 8, respectively.

In the above-described configuration, the lateral acceleration computation means may be configured to compute a positive vehicle coefficient Kv which becomes smaller when the vehicle speed is low, as compared with the case where the vehicle speed is high, and compute the lateral accelerations Gyf and Gyr of the vehicle at the front wheel position and at the rear wheel position in accordance with the following Equations 17 and 18, which correspond to the above-described Equations 7 and 8, respectively.

$$Gyf = Gy + Kv \cdot Iz \cdot \gamma d/(M \cdot Lr) \quad (17)$$

$$Gyr = Gy - Kv \cdot Iz \cdot \gamma d/(M \cdot Lf) \quad (18)$$

In the above-described configuration, the lateral acceleration acquisition means may be configured to employ the actual lateral acceleration as the lateral acceleration of the vehicle at the centroid when the magnitude of the actual lateral acceleration is equal to or greater than a first reference value.

In the above-described configuration, the lateral acceleration acquisition means may be configured to employ the actual yaw rate as the yaw rate of the vehicle about the centroid when the magnitude of the actual lateral acceleration is equal to or greater than a second reference value.

In the above-described configuration, the roll rigidity changing means may include an active stabilizer which includes two-piece stabilizer and an actuator for rotating torsion bar portions of the stabilizer in relation to each other, and increases and decreases the anti-roll moment by increasing and decreasing the rotation angle of the actuator, to thereby increase and decrease the roll rigidity.

In the above-described configuration, the roll rigidity changing means may be configured to increase and decrease the support rigidity of a suspension, by increasing and decreasing the spring constant of a suspension spring, to thereby increase and decrease the roll rigidity.

In the present specification, the terms "front wheel position" and "rear wheel position" respectively refer to the position of the front wheel axle with respect to the front-rear direction of the vehicle and the position of the rear wheel axle with respect to the front-rear direction of the vehicle.

BEST MODE FOR CARRYING OUT THE INVENTION

Below, preferred embodiments of the invention will be described in detail with reference to the accompanying drawings.

First Embodiment

Figure 1:
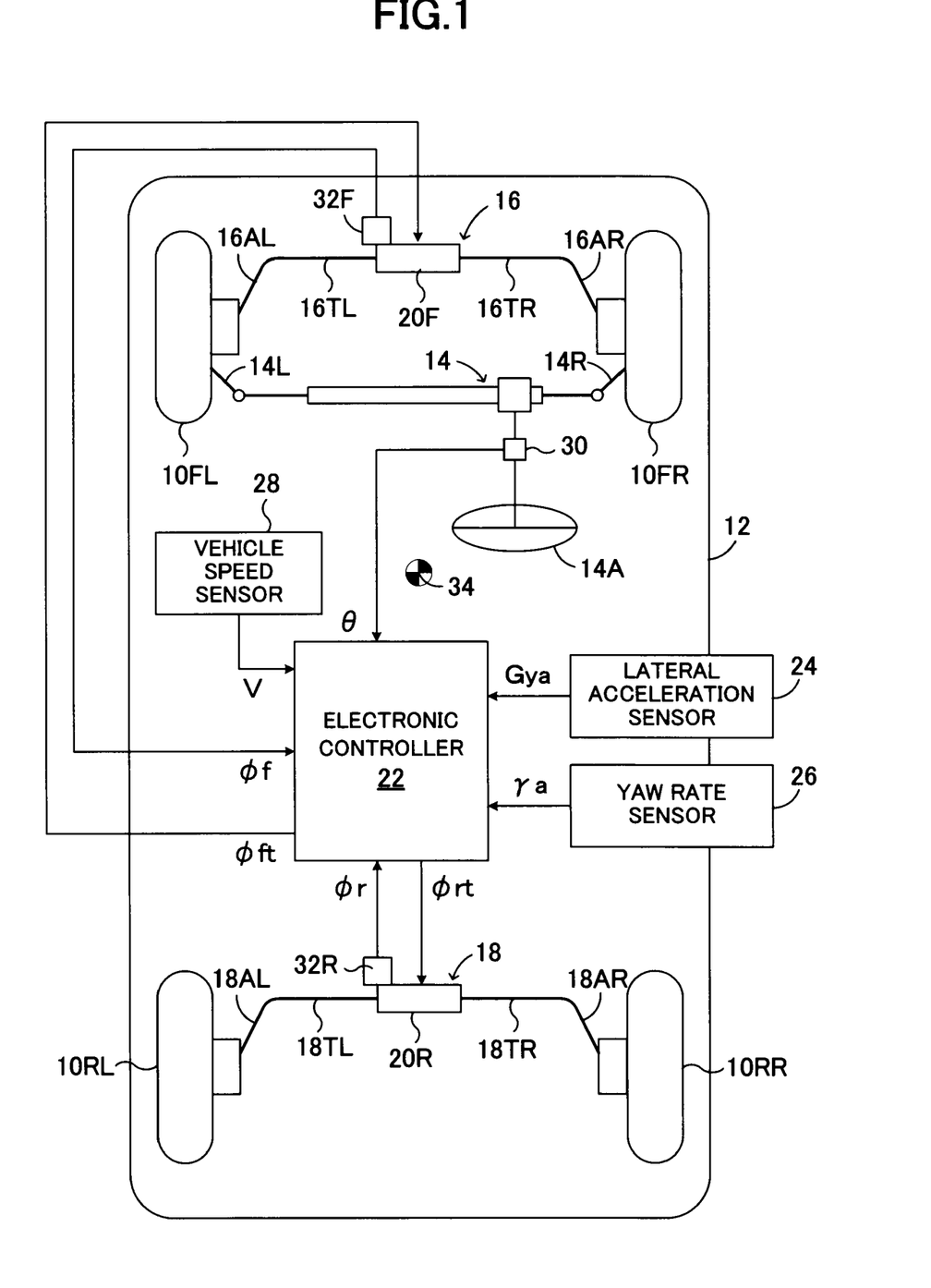
FIG. 1 is a schematic diagram showing a first embodiment of a vehicular roll rigidity control apparatus according to the present invention applied to a vehicle which includes active stabilizer apparatuses provided on the front wheel side and the rear wheel side.

FIG. 1 is a schematic diagram showing a first embodiment of a vehicular roll rigidity control apparatus according to the present invention applied to a vehicle which includes active stabilizer apparatuses provided on the front wheel side and the rear wheel side.

In FIG. 1, reference numerals 10FL and 10FR respectively denote left and right front wheels of a vehicle 12, and 10RL and 10RR respectively denote left and right rear wheels of the vehicle 12. The left and right front wheels 10FL and 10FR, which are steerable wheels, are steered via tie rods 14L and 14R by means of a power steering apparatus 14, which is driven in response to steering operation of a steering wheel 14A by a driver. Notably, the vehicle to which the roll rigidity control apparatus of the present invention is applied may be of a front-wheel drive type, a rear-wheel drive type, or a four-wheel drive type.

An active stabilizer apparatus 16 is provided between the left and right front wheels 10FL and 10FR, and an active stabilizer apparatus 18 is provided between the left and right rear wheels 10RL and 10RR. Each of the active stabilizer apparatuses 16 and 18 functions as anti-roll-moment generation means which generates an anti-roll moment by increasing and decreasing a stabilizer forcer acting between the sprung side and the unsprung side at the front wheel position or the rear wheel position, and applying the anti-roll moment to the vehicle (the vehicle body). The anti-roll-moment generation means also increases and decreases the anti-roll moment when necessary.

The active stabilizer apparatus 16 includes a pair of torsion bar portions 16TL and 16TR which coaxially extend in an aligned manner along an axis extending in the lateral direction of the vehicle; and a pair of arm portions 16AL and 16AR integrally connected to outer ends of the torsion bar portions 16TL and 16TR. The torsion bar portions 16TL and 16TR are mounted to the unillustrated vehicle body via unillustrated brackets such that the torsion bar portions 16TL and 16TR can rotate about their own axes. The arm portions 16AL and 16AR extend in the front-rear direction of the vehicle so as to intersect the torsion bar portions 16TL and 16TR, respectively. The outer ends of the arm portions 16AL and 16AR are connected to wheel support members or suspension arms of the left and right front wheels 10FL and 10FR, respectively, via unillustrated rubber bush devices.

The active stabilizer apparatus 16 includes an actuator 20F between the torsion bar portions 16TL and 16TR. When necessary, the actuator 20F rotates and drives the paired torsion bar portions 16TL and 16TR in opposite directions so as to change, when the left and right front wheels 10FL and 10FR bound and rebound in antiphase with each other, the force for suppressing the bound and rebound of the wheels, by means of torsional stress, to thereby increase and decrease the anti-roll moment applied to the vehicle at the position of the left and right front wheels, and change the roll rigidity of the vehicle at the front wheel position.

Similarly, the active stabilizer apparatus 18 includes a pair of torsion bar portions 18TL and 18TR which coaxially extend in an aligned manner along an axis extending in the lateral direction of the vehicle; and a pair of arm portions 18AL and 18AR integrally connected to outer ends of the torsion bar portions 18TL and 18TR. The torsion bar portions 18TL and 18TR are mounted to the unillustrated vehicle body via unillustrated brackets such that the torsion bar portions 18TL and 18TR can rotate about their own axes. The arm portions 18AL and 18AR extend in the front-rear direction of the vehicle so as to intersect the torsion bar portions 18TL and 18TR, respectively. The outer ends of the arm portions 18AL and 18AR are connected to wheel support members or suspension arms of the left and right rear wheels 10RL and 10RR, respectively, via unillustrated rubber bush devices.

The active stabilizer apparatus 18 includes an actuator 20R between the torsion bar portions 18TL and 18TR. When necessary, the actuator 20R rotates and drives the paired torsion bar portions 18TL and 18TR in opposite directions so as to change, when the left and right rear wheels 10RL and 10RR bound and rebound in antiphase with each other, the force for suppressing the bound and rebound of the wheels, by means of torsional stress, to thereby increase and decrease the anti-roll moment applied to the vehicle at the position of the left and right rear wheels, and change the roll rigidity of the vehicle at the rear wheel position.

Notably, since the structure itself of the active stabilizer apparatuses 16 and 18 is not the feature of the present invention, any structure known in this technical field may be employed, so long as the employed structure can variably control the roll rigidity of the vehicle.

The actuators 20F and 20R of the active stabilizer apparatuses 16 and 18 are controlled by an electronic controller 22. Although not illustrated in detail in FIG. 1, the electronic controller 22 may be composed of a drive circuit and a microcomputer including a CPU, ROM, RAM, and an input/output port device, which are connected to one another via a bidirectional common bus.

As shown in FIG. 1, the electronic controller 22 receives a signal indicating actual lateral acceleration Gya of the vehicle at the centroid 34 thereof, which is detected by a lateral acceleration sensor 24, a signal indicating actual yaw rate γa about the centroid 34 detected by a yaw rate sensor 26, a signal representing vehicle speed V detected by a vehicle speed sensor 28, a signal representing steering angle θ detected by a steering angle sensor 30, and signals representing actual rotation angles ϕsf and ϕsr of the actuators 20F and 20R detected by rotation angle sensors 32F and 32R.

The lateral acceleration sensor 24, the yaw rate sensor 26, the steering angle sensor 30, and the rotation angle sensors 32F and 32R detect the actual lateral acceleration Gya, the actual yaw rate γa, the steering angle θ, and the rotation angles ϕsf and ϕsr such that the respective values produced when the vehicle turns leftward are positive. The lateral acceleration sensor 24 and the yaw rate sensor 26 are preferably disposed at the centroid 34 of the vehicle; however, one of these sensors may be disposed at a location other than the centroid 34. In such a case, preferably, the value detected by that sensor is corrected in a manner known in the present technical field, whereby the value is corrected to represent the actual lateral acceleration Gya of the vehicle at the centroid 34 or the actual yaw rate γa of the vehicle about the centroid 34.

Figure 2:
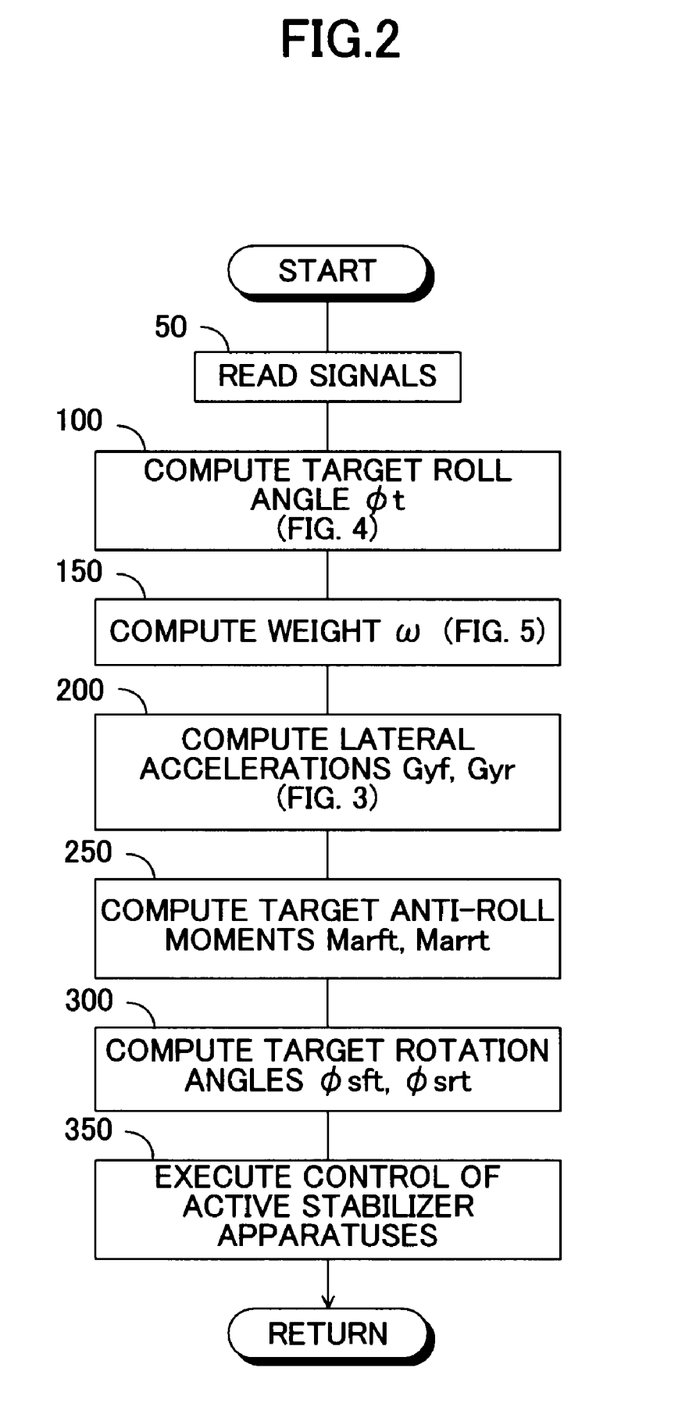
FIG. 2 is a flowchart showing a main routine for roll rigidity control in the first embodiment.
Figure 3:
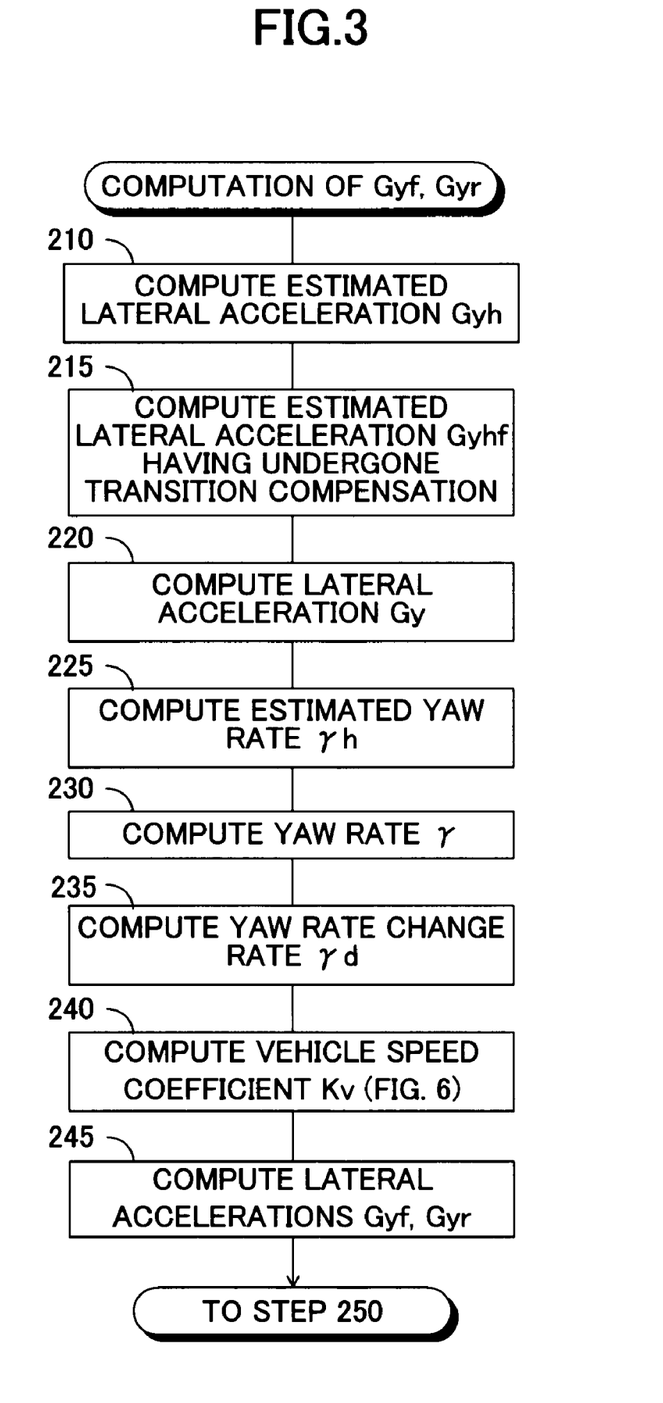
FIG. 3 is a flowchart showing a subroutine for computing lateral accelerations of the vehicle at a front wheel position and a rear wheel position in the first embodiment.

The electronic controller 22 computes a target roll angle ϕt of the vehicle and a weight ω from the actual lateral acceleration Gya of the vehicle in accordance with flowcharts shown in FIGS. 2 and 3. Also, the electronic controller 22 computes an estimated lateral acceleration Gyh and an estimated yaw rate γh of the vehicle from the vehicle speed V and the steering angle θ, and subjects the estimated lateral acceleration Gyh to low-pass filter processing so as to compute a low-pass-filtered estimated lateral acceleration Gyhf. Further, the electronic controller 22 computes, as a lateral acceleration Gy of the vehicle for roll rigidity control, a weighted average of the estimated lateral acceleration Gyhf and the actual lateral acceleration Gya on the basis of the weight ω, and computes, as a yaw rate γ of the vehicle for roll rigidity control, a weighted average of the estimated yaw rate γh and the actual yaw rate γa on the basis of the weight ω.

Also, the electronic controller 22 computes a vehicle speed coefficient Kv and the front-wheel-side distribution ratio Rsf of roll rigidity on the basis of the vehicle speed V, and computes lateral accelerations Gyf and Gyr of the vehicle at the front wheel position and the rear wheel position from the rate of change γd of the yaw rate γ of the vehicle in accordance with the above-described Equations 17 and 18. The electronic controller 22 then computes a target anti-roll moment Marft at the front wheel position and a target anti-roll moment Marrt at the rear wheel position from the target roll angle ϕrt, the lateral accelerations Gyf and Gyr at the front wheel position and the rear wheel position, and the roll rigidity front-wheel-side distribution ratio Rsf, in accordance with the above-described Equations 13 and 14.

Further, the electronic controller 22 computes target rotation angles ϕsft and ϕsrt of the actuators 20F and 20R of the active stabilizer apparatuses 16 and 18 from the target anti-roll moments Marft and Marrt, and controls the actuators 20F and 20R so that the rotation angles ϕsf and ϕsr of the actuators 20F and 20R coincide with the corresponding target rotation angles ϕsft and ϕsrt to thereby optimally control the roll of the vehicle at the time of turning or the like in accordance with the state of turn motion of the vehicle.

Thus, each of the active stabilizer apparatuses 16 and 18 serves as roll rigidity changing means for increasing and decreasing the roll rigidity of the vehicle by increasing and decreasing the anti-roll moments at the front wheel position and the rear wheel position. The lateral acceleration sensor 24, the vehicle speed sensor 28, the steering angle sensor 30, and the electronic control 22 function as means for acquiring the lateral acceleration Gy of the vehicle at the centroid 34. The yaw rate sensor 26, the vehicle speed sensor 28, the steering angle sensor 30, and the electronic controller 22 function as means for obtaining the yaw rate γ of the vehicle about the centroid 34.

Further, the electronic controller 22 functions as lateral acceleration computation means for computing the lateral accelerations Gyf and Gyr at the front wheel position and the rear wheel position, and also functions as control means for computing the target anti-roll moments Marft and Marrt at the front wheel position and the rear wheel position from the lateral accelerations Gyf and Gyr of the vehicle at the front wheel position and the rear wheel position, and controlling the active stabilizer apparatuses 16 and 18 (the roll rigidity changing means) at the front wheel position and the rear wheel position on the basis of the target anti-roll moments Marft and Marrt.

Next, the control of roll rigidity in the present embodiment will be described with reference to the flowcharts shown in FIGS. 2 and 3. Control according to the flowcharts shown in FIGS. 2 and 3 is started when an unillustrated ignition switch is turned on, and is repeatedly executed at predetermined time intervals until the ignition switch is turned off.

Figure 4:
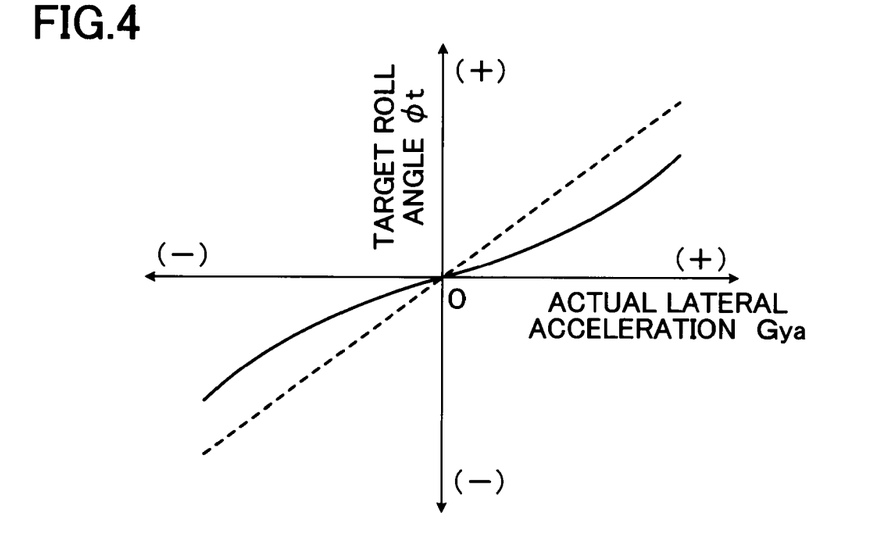
FIG. 4 is a graph showing the relation between actual lateral acceleration Gya at the centroid of the vehicle and target roll angle $\phi t$ of the vehicle.

First, in step 50, the lateral acceleration Gy of the vehicle at the centroid 34 detected by the lateral acceleration sensor 24, etc. are read. In step 100, by reference to a map corresponding to a graph shown in FIG. 4, the target roll angle φt of the vehicle is computed from the actual lateral acceleration Gya at the centroid position of the vehicle. Notably, in FIG. 4, a broken line shows the ratio between lateral acceleration Gy and roll angle φ of a conventionally known general vehicle in which the stabilizer force is not increased and decreased. The target roll angle φt is set such that its magnitude assumes a value smaller than the corresponding value represented by the broken line.

Figure 5:
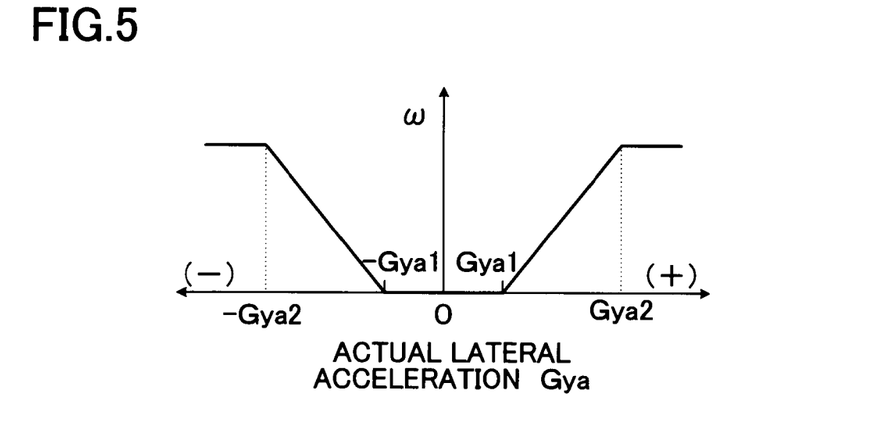
FIG. 5 is a graph showing the relation between actual lateral acceleration Gya at the centroid of the vehicle and weight $\omega$.

In step 150, by reference to a map corresponding to a graph shown in FIG. 5, the weight ω is computed from the actual lateral acceleration Gya at the centroid position of the vehicle. In step 200, the lateral accelerations Gyf and Gyr of the vehicle at the front wheel position and the rear wheel position are computed in accordance with the flowchart shown in FIG. 3, as will be described later. Notably, the weight ω is computed such that the weight ω is 0 when the magnitude of the actual lateral acceleration Gya is not greater than a reference value Gya1, and is 1 when the magnitude of the actual lateral acceleration Gya is not less than a reference value Gya2, and gradually increases with the magnitude of the actual lateral acceleration Gya when the magnitude of the actual lateral acceleration Gya is greater than the reference value Gya1 and less than the reference value Gya2.

In step 250, the target anti-roll moment Marft at the front wheel position and the target anti-roll moment Marrt at the rear wheel position are respectively computed from the acceleration Gyf at the front wheel position and the acceleration Gyr at the rear wheel position in accordance with the above-described Equations 13 and 14 such that the greater the acceleration Gyf at the front wheel position and the acceleration Gyr at the rear wheel position, the greater the magnitudes of the target anti-roll moment Marft at the front wheel position and the target anti-roll moment Marrt at the rear wheel position. Notably, in this case, the mass M of the vehicle, the distance Hs, the roll rigidities Krf and Krr of the vehicle in the above-described Equations 13 and 14 are previously set to predetermined values on the basis of the specifications of the vehicle, and the front-wheel-side distribution ratio Rsf of roll rigidity is variously set in accordance with the vehicle speed V such that the front-wheel-side distribution ratio Rsf increases with the vehicle speed V within a range between 0 and 1.

In step 300, the target rotation angle φsft and φsrt of the actuators 20F and 20R of the active stabilizer apparatuses 16 and 18 are computed from the target anti-roll moment Marft at the front wheel position and the target anti-roll moment Marrt at the rear wheel position. In step 350, the active stabilizer apparatuses 16 and 18 are controlled such that the rotation angles φsft and φsrt of the actuators 20F and 20R coincide with the corresponding target rotation angles φsft and φsrt, respectively.

In step 210 of the routine of FIG. 3 for computing the lateral accelerations Gyf and Gyr, the estimated lateral acceleration Gyh is computed from the vehicle speed V and the steering angle θ in accordance with the following Equation 19, wherein H represents a wheel base, Rg represents a steering gear ratio, and Kh represents a stability factor. In step 215, the estimated lateral acceleration Gyh is subjected to, for example, low-pass filtering so as to compute the estimated lateral acceleration Gyhf having undergone transition compensation.

$$Gyh = V2 \cdot (\theta/Rg)/\{1+Kh \cdot V2)H\} \quad (19)$$

In step 220, in accordance with the following Equation 20, the weighted average of the estimated lateral acceleration Gyhf having undergone transition compensation and the actual lateral acceleration Gya is computed as the lateral acceleration Gy at the centroid of the vehicle for roll rigidity control.

$$Gy = (1-\omega)Gyh + \omega \cdot Gya \quad (20)$$

In step 225, the estimated yaw rate γh about the centroid of the vehicle is computed from the vehicle speed V and the steering angle θ in accordance with the following Equation 21. In step 230, as the yaw rate γ about the centroid of the vehicle for roll rigidity control, the weighted average of the estimated yaw rate γh and the actual yaw rate γa is computed on the basis of the weight ω computed in the above-described step 150 and in accordance with the following Equation 22.

$$\gamma h = V \cdot (\theta/Rg)/\{1+Kh \cdot V2)H\} \quad (21)$$

$$\gamma = (1-\omega)\gamma h + \omega \cdot \gamma a \quad (22)$$

Figure 6:
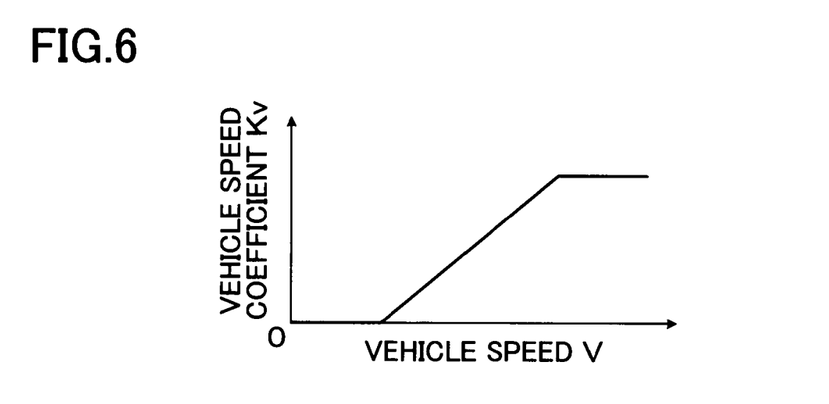
FIG. 6 is a graph showing the relation between vehicle speed V and vehicle speed coefficient Kv.

In step 235, for example, the rate of change yd of the yaw rate γ is computed as a time differentiated value of the yaw rate γ. In step 240, by reference to a map corresponding to a graph shown in FIG. 6, the vehicle speed coefficient Kv is computed from the vehicle speed V such that the vehicle speed coefficient Kv assumes a value not less than and not greater than 1. Notably, the vehicle speed coefficient Kv is computed such that the vehicle speed coefficient Kv is 0 when the vehicle speed V is not greater than a reference value V1, and is 1 when the vehicle speed V is not less than a reference value V2, and gradually increases with the vehicle speed V when the vehicle speed V is greater than the reference value V1 and less than the reference value V2.

In step 245, the lateral accelerations Gyf and Gyr of the vehicle at the front wheel position and the rear wheel position are computed in accordance with the above-described Equations 17 and 18, respectively. In this case, the yaw inertia moment Iz of the vehicle, the distance Lf (in the front-rear direction of the vehicle) between the centroid of the vehicle and the front wheel position, and the distance Lr (in the front-rear direction of the vehicle) between the centroid of the vehicle and the rear wheel position are previously set to predetermined values on the basis of the specifications of the vehicle.

Thus, according to the illustrated first embodiment, in step 100 the target roll angle φt of the vehicle is computed from the actual lateral acceleration Gya at the centroid position of the vehicle; in step 200 the lateral accelerations Gyf and Gyr of the vehicle at the front wheel position and the rear wheel position are computed; in step 250 the target anti-roll moment Marft at the front wheel position and the target anti-roll moment Marrt at the rear wheel position are respectively computed from the acceleration Gyf at the front wheel position and the acceleration Gyr at the rear wheel position; and in step 300 the active stabilizer apparatuses 16 and 18 are controlled on the basis of the target anti-roll moment Marft at the front wheel position and the target anti-roll moment Marrt at the rear wheel position.

Accordingly, it is possible to compute the target anti-roll moments Marft and Marrt as values exactly corresponding to the lateral accelerations Gyf and Gyr at the front wheel position and the rear wheel position; i.e., values exactly corresponding to the roll moments at the front wheel position and the rear wheel position, and to control the anti-roll moments at the front wheel position and the rear wheel position to the target anti-roll moments Marft and Marrt, respectively. Thus, by means of reliably performing optimal roll rigidity control in accordance with the turning state of the vehicle, the roll angle φ of the vehicle can be controlled to the target roll angle φt, whereby the rolled posture of the vehicle during the turning can be reliably controlled to a desired posture.

In this case, the lateral accelerations Gyf and Gyr of the vehicle at the front wheel position and the rear wheel position are computed in step 200 in accordance with the above-described Equations 17 and 18. That is, the acceleration Gyf at the front wheel position can be computed from the actual lateral acceleration Gya at the centroid of the vehicle through addition thereto of a correction amount ΔGyf of lateral acceleration for the front wheel position, which amount is represented by the following Equation 23. Similarly, the acceleration Gyr at the rear wheel position can be computed from the actual lateral acceleration Gya at the centroid of the vehicle through addition thereto of a correction amount ΔGyr of lateral acceleration for the rear wheel position, which amount is represented by the following Equation 24.

$$\Delta Gyf = Iz \cdot \gamma d / (M \cdot Lr) \quad (23)$$

$$\Delta Gyr = Iz \cdot \gamma d / (M \cdot Lf) \quad (24)$$

Accordingly, the correction amounts ΔGyf and ΔGyr of lateral acceleration can be accurately computed on the basis of the rate of change γd of the yaw rate γ of the vehicle; i.e., in consideration of the state of rotation of the vehicle associated with the turn of the vehicle. Thus, the lateral accelerations Gyf and Gyr of the vehicle at the front wheel position and the rear wheel position can be accurately computed.

In particular, according to the illustrated first embodiment, the actual yaw rate γa of the vehicle about the centroid is detected; in step 210 the estimated lateral acceleration Gyh of the vehicle at the centroid is computed from the vehicle speed V and the steering angle φ; in step 220 the product of the vehicle speed V and the estimated lateral acceleration Gyhf having undergone transition compensation is computed as the estimated yaw rate γh of the vehicle about the centroid; in step 230 the weighted average of the actual yaw rate γa and the estimated yaw rate γh is computed as the yaw rate γ of the vehicle about the centroid; and in step 245 the correction amounts ΔGyf and ΔGyr of lateral acceleration are computed on the basis of the rate of change γd of the yaw rate γ.

In general, the phase of the estimated yaw rate γh leads the phase of the actual yaw rate γa. Therefore, the lateral accelerations Gyf and Gyr of the vehicle can be computed with higher responsiveness as compared with the case where the correction amounts ΔGyf and ΔGyr of lateral acceleration are computed on the basis of the rate of change of the actual yaw rate γa. Thus, the control of the roll rigidity of the vehicle at the front wheel position and the rear wheel position can be performed without delay.

Further, according to the illustrated first embodiment, the weight ω, which is used for computation of the yaw rate γ of the vehicle about the centroid in step 230, is variably set in accordance with the actual acceleration Gya such that the weight ω gradually increases with the actual acceleration Gya. Since the phase of the estimated yaw rate γh leads the phase of the actual yaw rate γa as described above, the yaw rate γ of the vehicle can be computed with higher responsiveness as compared with the case where the yaw rate γ of the vehicle is set to be equal to the actual yaw rate γa. However, as the degree of turn of the vehicle increases, the reliability of the estimated yaw rate γh decreases. Accordingly, according to the illustrated first embodiment, the yaw rate γ of the vehicle can be computed with satisfactory responsiveness in a situation where the degree of turn of the vehicle is low; and it is possible to reliably reduce the possibility of the yaw rate γ of the vehicle being inaccurately computed in a situation where the degree of turn of the vehicle is high.

Second Embodiment

Figure 7:
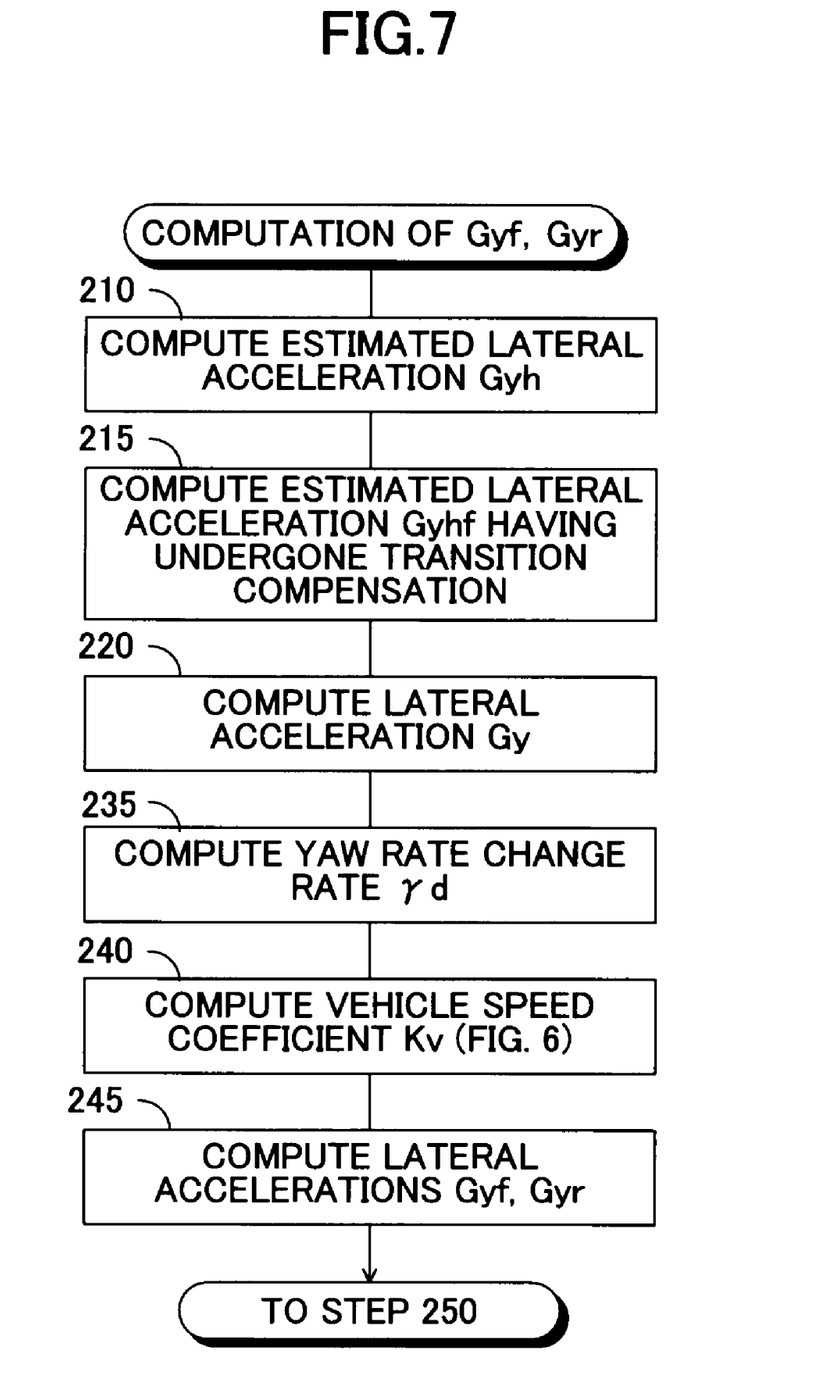
FIG. 7 is a flowchart showing a subroutine for computing lateral accelerations of the vehicle at the front wheel position and the rear wheel position in a second embodiment.

FIG. 7 is a flowchart showing a lateral acceleration computation routine in a second embodiment of the vehicular roll rigidity control apparatus according to the present invention. Notably, in FIG. 7, steps identical with those shown in FIG. 3 are denoted by the same step numbers as those used in FIG. 3.

In this second embodiment, the main routine for roll rigidity control is performed in the same manner as in the above-described first embodiment in accordance with the flowchart shown in FIG. 2, except that the lateral accelerations Gyf and Gyr of the vehicle at the front wheel position and the rear wheel position are computed in step 200 in accordance with the flowchart shown in FIG. 7. Further, as shown in FIG. 7, steps 210 to 220, 240, and 245 of the lateral acceleration computation routine are executed in the same manner as in the above-described first embodiment.

After completion of step 220, without performance of steps corresponding to steps 225 and 230 in the above-described first embodiment, the electronic controller 22 proceeds to step 235 in which the yaw rate γ about the centroid of the vehicle is set to be equal to the actual yaw rate γa, and the rate of change γd of the yaw rate γ is computed as the time differentiated value of the actual yaw rate γa.

Thus, according to the illustrated second embodiment, as in the case of the first embodiment, the lateral acceleration correction amounts ΔGyf and ΔGyr can be accurately computed in consideration of the state of rotation of the vehicle associated with the turn of the vehicle. Accordingly, by means of reliably performing optimal roll rigidity control in accordance with the turning state of the vehicle, the roll angle φ of the vehicle can be controlled to the target roll angle φt, whereby the rolled posture of the vehicle during the turning can be reliably controlled to a desired posture.

In particular, according to the illustrated second embodiment, the rate of change γd of the yaw rate γ, which is used for computation of the lateral acceleration correction amounts ΔGyf and ΔGyr, is computed as the time differentiated value of the actual yaw rate γa in step 235. Therefore, computation of the estimated yaw rate γh is unnecessary, and the lateral accelerations Gyf and Gyr of the vehicle at the front wheel position and the rear wheel position can be computed simply as compared with the above-described first embodiment.

According to the above-described first and second embodiments, the active stabilizer apparatuses 16 and 18, each serving as roll rigidity changing means, are provided at the front wheel position and the rear wheel position, respectively; and both the roll rigidities at the front wheel position and the rear wheel position are controlled as described above. Therefore, the roll rigidity control can be performed more effectively and more reliably as compared with the case where the roll rigidity changing means is provided only at the front wheel position or the rear wheel position, and only the roll rigidity at the front wheel position or that at the rear wheel position is controlled.

According to the above-described first and second embodiments, the estimated lateral acceleration Gyh at the centroid is computed from the vehicle speed V and the steering angle θ in step 210; and the weighted average of the actual lateral acceleration Gya of the vehicle at the centroid and the estimated lateral acceleration Gyhf having undergone transition compensation is computed as the lateral acceleration Gy of the vehicle at the centroid in step 220. Therefore, the roll rigidities at the front wheel position and the rear wheel position can be controlled with high responsiveness for a change in the turning state of the vehicle, as compared with the case where the lateral acceleration of the vehicle to be used for roll rigidity control is the actual lateral acceleration Gya.

According to the above-described first and second embodiments, the weight ω, which is used for computation of the lateral acceleration Gy of the vehicle at the centroid in step 220, is variably set in accordance with the actual acceleration Gya such that the weight ω gradually increases as the actual acceleration Gya increases. Like the estimated yaw rate γh, the reliability of the estimated lateral acceleration Gyh of the vehicle decreases as the degree of turn of the vehicle increases. Accordingly, according to the above-described first and second embodiments, the lateral acceleration Gy of the vehicle can be computed with satisfactory responsiveness in a situation where the degree of turn of the vehicle is low; and it is possible to reliably reduce the possibility of the lateral acceleration Gy of the vehicle being inaccurately computed in a situation where the degree of turn of the vehicle is high.

As described above, when the vehicle speed V is low, the magnitude of the actual lateral acceleration of the vehicle is small as compared with the case where the vehicle speed V is high, and the difference in lateral acceleration between the front wheel position and the rear wheel position is also small, so that the influence of the difference in lateral acceleration between the front wheel position and the rear wheel position on the sense of a vehicle occupant is also small. Further, the correction amounts ΔGyf and ΔGyr of lateral acceleration at the front wheel position and the rear wheel position based on the yaw rate of the vehicle about the centroid are correction amounts of lateral acceleration based on the yaw rate change rate γd. Therefore, the correction amounts ΔGyf and ΔGyr are likely to be affected by noise or the like. Accordingly, when the vehicle speed V is low, preferably, the magnitudes of the correction amounts ΔGyf and ΔGyr of lateral acceleration at the front wheel position and the rear wheel position assume smaller values as compared with the case where the vehicle speed V is high.

According to the above-described first and second embodiments, the vehicle speed coefficient Kv is computed in step 240 such that the smaller the vehicle speed V, the smaller the vehicle speed coefficient Kv; and the lateral accelerations Gyf and Gyr of the vehicle at the front wheel position and the rear wheel position are computed in accordance with the above-described Equations 17 and 18, respectively, in step 245. Accordingly, when the vehicle speed V is low, the magnitudes of the lateral acceleration correction amounts ΔGyf and ΔGyr for the front wheel position and the rear wheel position are decreased as compared with the case where the vehicle speed is high. Accordingly, when the vehicle speed V is high, the lateral accelerations Gyf and Gyr of the vehicle at the front wheel position and the rear wheel position can be computed accurately; and when the vehicle speed is low, it is possible to effectively prevent the control variables of the roll rigidity changing means at the front wheel position and the rear front wheel position from suddenly changing, which change would otherwise occur when the values of the lateral accelerations Gyf and Gyr of the vehicle at the front wheel position and the rear wheel position suddenly change because of influence of noise or the like.

Further, according to the first embodiment, the weight which is used for computation of the lateral acceleration Gy of the vehicle at the centroid in step 220, and the weight which is used for computation of the yaw rate γ of the vehicle at the centroid in step 230 are computed as the common weight ω in step 150. Accordingly, the amount of necessary computation can be reduced as compared with the case where the weight used for computation of the lateral acceleration Gy and the weight used for computation of the yaw rate γ are computed separately.

The present invention has been described in detail by reference to specific embodiments thereof; however, it is clear for a person with ordinary skill in the art that the present invention is not limited to the above-described embodiments and can be modified in various other forms without departing from the scope of the invention.

For example, the above embodiments are configured such that the estimated lateral acceleration Gyh of the vehicle at the centroid is computed from the vehicle speed V and the steering angle θ in step 210; and the weighted average of the actual lateral acceleration Gya of the vehicle at the centroid and the estimated lateral acceleration Gyhf having undergone transition compensation is computed as the lateral acceleration Gy of the vehicle at the centroid in step 220. However, the computation of the estimated lateral acceleration Gyh of the vehicle may be omitted, and the lateral acceleration Gy of the vehicle may be set to be equal to the actual lateral acceleration Gya of the vehicle.

In the above-described first embodiment, the product of the vehicle speed V and the estimated lateral acceleration Gyhf having undergone transition compensation is computed as the estimated yaw rate γh of the vehicle about the centroid in step 220; and the weighted average of the actual yaw rate γa and the estimated yaw rate γh is computed as the yaw rate γ of the vehicle about the centroid in step 230. However, the computation of the estimated yaw rate γh may be omitted, and the yaw rate γ of the vehicle may be set to be equal to the actual yaw rate γa.

In the above-described embodiments, the target anti-roll moment Marft at the front wheel position and the target anti-roll moment Marrt at the rear wheel position are computed in step 250 from the acceleration Gyf at the front wheel position and the acceleration Gyr at the rear wheel position in accordance with the above-described Equations 13 and 14. However, the above-described embodiments may be modified such that the target anti-roll moments Marft and Marrt are computed in accordance with the above-described Equations 15 and 16, respectively.

In the above-described embodiments, the vehicle speed coefficient Kv is computed in step 240 such that the lower the vehicle speed V, the smaller the vehicle speed coefficient Kv; and the lateral accelerations Gyf and Gyr of the vehicle at the front wheel position and the rear wheel position are computed in step 245 in accordance with the above-described Equations 17 and 18, respectively. However, the vehicle speed coefficient Kv may be omitted.

In the above-described embodiments, the weight which is used for computation of the lateral acceleration Gy of the vehicle at the centroid in step 220, and the weight which is used for computation of the yaw rate γ of the vehicle about the centroid in step 230 are computed as the common weight w in step 150. However, the weight which is used for computation of the lateral acceleration Gy of the vehicle at the centroid and the weight which is used for computation of the yaw rate γ of the vehicle about the centroid may differ from each other. Further, the reference value Gya2 for the actual lateral acceleration Gya of the vehicle at which the weight becomes 1 may differ between the weight which is used for computation of the lateral acceleration Gy of the vehicle and the weight which is used for computation of the yaw rate γ of the vehicle about the centroid.

In the above-described embodiments, the target roll angle φt of the vehicle is computed on the basis of the actual lateral acceleration Gya of the vehicle in step 100, and the weight ω is computed on the basis of the actual lateral acceleration Gya of the vehicle in step 150. However, the embodiments may be modified such that at least one of the target roll angle φt and the weight ω is computed on the basis of the lateral acceleration Gy of the vehicle, which is the weighted average of the actual lateral acceleration Gya of the vehicle and the estimated lateral acceleration Gyhf having undergone transition compensation.

In the above-described embodiments, the active stabilizer apparatuses 16 and 18, each serving as roll rigidity changing means, are provided at the front wheel position and the rear wheel position, respectively. However, the roll rigidity control apparatus of the present invention can be applied to a vehicle in which the roll rigidity changing means is provided only at one of the front wheel position and the rear wheel position, and roll suppression means whose roll rigidity is fixed, such as an ordinary stabilizer, is provided at the other wheel position.

In particular, in the case where the roll rigidity changing means is provided only at the front wheel position, the target anti-roll moment Marft at the front wheel position is computed in accordance with the above-described Equation 13 or 15, and the roll rigidity changing means at the front wheel position is controlled on the basis of the target anti-roll moment Marft; and in the case where the roll rigidity changing means is provided only at the rear wheel position, the target anti-roll moment Marrt at the rear wheel position is computed in accordance with the above-described Equation 14 or 16, and the roll rigidity changing means at the rear wheel position is controlled on the basis of the target anti-roll moment Marrt.

In the above-described embodiments, at each of the front wheel position and the rear wheel position, an active stabilizer apparatus is provided as roll rigidity changing means which increases and decreases anti-roll moment. However, the roll rigidity changing means may be any means known in the present technical field, such as an active suspension, which means can increase and decrease the support rigidity of the suspension, by increasing and decreasing the spring constant of the suspension spring, to thereby increase and decrease the roll rigidity. Further, the roll rigidity changing means at the front wheel position may differ in type from the roll rigidity changing means at the rear wheel position.

The invention claimed is:

1. A roll rigidity control apparatus for a vehicle which includes roll rigidity changing means at a front wheel position or a rear wheel position, the apparatus comprising:
   lateral acceleration acquisition means for acquiring a lateral acceleration of the vehicle at the centroid thereof;
   yaw rate acquisition means for acquiring a yaw rate of the vehicle about the centroid;
   lateral acceleration computation means for computing a lateral acceleration of the vehicle at the front wheel position or the rear wheel position on the basis of the lateral acceleration, the yaw rate, a yaw inertial moment of the vehicle, a vehicle speed coefficient based on a vehicle speed, and the rear wheel position or the front wheel position, respectively, measured along a front-rear direction of the vehicle; and
   control means for computing a target anti-roll moment at the front wheel position or the rear wheel position on the basis of the lateral acceleration of the vehicle at the front wheel position or the rear wheel position, correspondingly, and controlling the roll rigidity changing means at the front wheel position or the rear wheel position on the basis of the target anti-roll moment at the front wheel position or the rear wheel position, correspondingly
   wherein the vehicle speed coefficient is between 0 and 1, the vehicle speed coefficient equals 0 when the vehicle speed is less than a first reference value, the vehicle speed coefficient equals 1 when the vehicle speed is greater than a second reference value, and the vehicle speed coefficient increases with the vehicle speed when the vehicle speed is greater than the first reference value and less than the second reference value.

2. A roll rigidity control apparatus for a vehicle according to claim 1, wherein the control means computes a target roll angle of the vehicle on the basis of at least the lateral acceleration of the vehicle at the centroid, and computes, on the basis of the lateral acceleration of the vehicle at the front wheel position or the rear wheel position, the target anti-roll moment at the front wheel position or the rear wheel position which renders a roll angle of the vehicle coincident with the target roll angle.

3. A roll rigidity control apparatus for a vehicle according to claim 1, wherein the vehicle includes the roll rigidity changing means at each of the front wheel position and the rear wheel position; the lateral acceleration computation means computes lateral accelerations of the vehicle at the front wheel position and the rear wheel position on the basis of the lateral acceleration and the yaw rate; and the control means computes target anti-roll moments at the front wheel position and the rear wheel position on the basis of the lateral accelerations of the vehicle at the front wheel position and the rear wheel position, respectively, and controls the roll rigidity changing means at the front wheel position and the rear wheel position on the basis of the target anti-roll moments at the front wheel position and the rear wheel position, respectively.

4. A roll rigidity control apparatus for a vehicle according to claim 1, wherein the lateral acceleration computation means computes a lateral acceleration correction amount for the front wheel position or the rear wheel position on the basis of the yaw rate of the vehicle about the centroid, and computes the lateral acceleration of the vehicle at the front wheel position or the rear wheel position by correcting the lateral acceleration of the vehicle at the centroid acquired by the lateral acceleration acquisition means by use of the lateral acceleration correction amount for the front wheel position or the rear wheel position, correspondingly.

5. A roll rigidity control apparatus for a vehicle according to claim 4, wherein the lateral acceleration computation means makes the magnitude of the correction amount smaller when the vehicle speed is low, as compared with the case where the vehicle speed is high.

6. A roll rigidity control apparatus for a vehicle according to claim 4, wherein the lateral acceleration acquisition means computes a lateral acceleration correction amount for the front wheel position on the basis of a distance between the centroid of the vehicle and the rear wheel position as measured along the front-rear direction of the vehicle and a change rate of the yaw rate of the vehicle about the centroid, or computes a lateral acceleration correction amount for the rear wheel position on the basis of a distance between the centroid of the vehicle and the front wheel position as measured along the front-rear direction of the vehicle and the change rate of the yaw rate of the vehicle about the centroid.

7. A roll rigidity control apparatus for a vehicle according to claim 1, wherein the lateral acceleration acquisition means detects an actual lateral acceleration of the vehicle at the centroid, computes an estimated lateral acceleration of the vehicle at the centroid on the basis of the vehicle speed and a steering angle of steerable wheels, computes the lateral acceleration of the vehicle at the centroid on the basis of the actual lateral acceleration and the estimated lateral acceleration, and decreases, when the magnitude of the actual lateral acceleration is large, a weight of the estimated lateral acceleration as compared with the case where the magnitude of the actual lateral acceleration is small.

8. A roll rigidity control apparatus for a vehicle according to claim 1, wherein the yaw rate acquisition means detects an actual yaw of the vehicle about the centroid, detects an actual lateral acceleration of the vehicle at the centroid, computes an estimated lateral acceleration of the vehicle at the centroid on the basis of the vehicle speed and a steering angle of steerable wheels, computes, as an estimated yaw rate of the vehicle about the centroid, a product of the vehicle speed and the estimated lateral acceleration, computes the yaw rate of the vehicle about the centroid on the basis of the actual yaw rate and the estimated yaw rate, and decreases, when the magnitude of the actual lateral acceleration is large, a weight of the estimated yaw rate as compared with the case where the magnitude of the actual lateral acceleration is small.

9. A roll rigidity control apparatus for a vehicle according to claim 1, wherein the yaw rate of the vehicle about the centroid is adjusted on the basis of the acquired lateral acceleration of the vehicle at the centroid.

10. A roll rigidity control apparatus for a vehicle according to claim 1, wherein the roll rigidity changing means changes the rigidity of an active stabilizer that includes a torsion bar portion which extends along a lateral direction of the vehicle and an arm portion which extends in the front-rear direction of the vehicle and is connected to a wheel support member or suspension arm of a wheel.

11. A roll rigidity control apparatus for a vehicle which includes roll rigidity changing means at a front wheel position or a rear wheel position, the apparatus comprising:
 lateral acceleration acquisition means for acquiring a lateral acceleration of the vehicle at the centroid thereof;
 yaw rate acquisition means for acquiring a yaw rate of the vehicle about the centroid;
 lateral acceleration computation means for computing a lateral acceleration of the vehicle at the front wheel position or the rear wheel position on the basis of the lateral acceleration and the yaw rate; and
 control means for computing a target anti-roll moment at the front wheel position or the rear wheel position on the basis of the lateral acceleration of the vehicle at the front wheel position or the rear wheel position, correspondingly, and controlling the roll rigidity changing means at the front wheel position or the rear wheel position on the basis of the target anti-roll moment at the front wheel position or the rear wheel position, correspondingly,
 wherein the vehicle includes the roll rigidity changing means at each of the front wheel position and the rear wheel position; the lateral acceleration computation means computes lateral accelerations of the vehicle at the front wheel position and the rear wheel position on the basis of the lateral acceleration and the yaw rate; and the control means computes target anti-roll moments at the front wheel position and the rear wheel position on the basis of the lateral accelerations of the vehicle at the front wheel position and the rear wheel position, respectively, and controls the roll rigidity changing means at the front wheel position and the rear wheel position on the basis of the target anti-roll moments at the front wheel position and the rear wheel position, respectively,
 wherein the control means computes a target roll angle of the vehicle on the basis of at least the lateral acceleration of the vehicle at the centroid; computes, on the basis of the lateral acceleration of the vehicle at the front wheel position and a previously set front-rear distribution ratio of roll rigidity, the target anti-roll moment at the front wheel position which renders a roll angle of the vehicle coincident with the target roll angle; and computes, on the basis of the lateral acceleration of the vehicle at the rear wheel position and the previously set front-rear distribution ratio of roll rigidity, the target anti-roll moment at the rear wheel position which renders the roll angle of the vehicle coincident with the target roll angle.

\* \* \* \* \*